United States Patent [19]

Block et al.

[11] Patent Number: 5,069,702

[45] Date of Patent: Dec. 3, 1991

[54] METHOD OF MAKING SMALL HOLLOW GLASS SPHERES

[75] Inventors: Jacob Block, Rockville, Md.; Noel J. Tessier, North Attleboro; Anthony J. Colageo, Sharon, both of Mass.

[73] Assignee: W. R. Grace & Co.-Conn., New York, N.Y.

[21] Appl. No.: 632,199

[22] Filed: Dec. 20, 1990

[51] Int. Cl.$^5$ ............................................. C03B 19/10
[52] U.S. Cl. ........................................ 65/21.4; 65/22; 264/42; 501/39
[58] Field of Search ..................... 65/21.4, 22; 264/42; 501/39

[56] References Cited

U.S. PATENT DOCUMENTS

| | | |
|---|---|---|
| 2,978,339 | 4/1961 | Veatch et al. . |
| 2,978,340 | 4/1961 | Veatch et al. . |
| 3,030,215 | 4/1962 | Veatch et al. . |
| 3,365,315 | 1/1968 | Beck et al. . |
| 4,133,854 | 1/1979 | Hendricks . |
| 4,257,799 | 4/1981 | Rosenewaig et al. . |
| 4,442,175 | 10/1984 | Flannery et al. ............... 65/21.4 |
| 4,661,137 | 4/1987 | Garnier et al. . |
| 4,778,502 | 10/1988 | Garnier et al. . |
| 4,822,534 | 4/1989 | Lencki et al. . |

OTHER PUBLICATIONS

Glass Microbaloon Particles for Construction Materials Ceramics Age, Apr. 1962, pp. 55, 56 and 58.

*Primary Examiner*—Robert L. Lindsay
*Attorney, Agent, or Firm*—Steven Capella

[57] ABSTRACT

Small hollow glass spheres are prepared by adding a surfactant to a liquid glass precursor mixture. The surfactant-containing solution or dispersion can be formed into droplets which are directed into a heated zone and the product collected in a cooler zone. Alternately, the solution or dispersion may be spray-dried, and the spray-dried product is fed into the heated zone and collected in the cooler zone. Nonionic fluorocarbon surfactants are the preferred surfactants.

20 Claims, No Drawings

METHOD OF MAKING SMALL HOLLOW GLASS SPHERES

FIELD OF THE INVENTION

This invention relates to a method for preparation of small hollow glass spheres.

BACKGROUND OF THE INVENTION

Small hollow glass spheres are desirable in many industries for use as fillers for various organic and inorganic matrices. With these spheres, special properties can be achieved such as low dielectric constant, high strength to weight ratio and low thermal conductivity.

In the electronics industry, small microspheres are desirable because conductor lines deposited on electronic substrates are small, and the spheres, in order to be effective, should be close to the dimensions of these conductor lines.

U.S. Pat. Nos. 2,978,339, 2,978,340 and 3,030,215 to Veatch et al. describe a method of forming hollow glass spheres from siliceous-based feed particles by using a bottom feed of particles into an ascending column of hot furnace gases. The preferred feed is an alkali metal silicate which contains an agent rendering the product glass spheres less sensitive to water. These agents include metal oxides such as oxides of zinc, aluminum, calcium, iron, boron, magnesium or lead. Also incorporated into the feed material is a "gasifying agent" to produce a low density product.

Such "gasifying agents" or "blowing agents" are substances that liberate gases at elevated temperatures. Examples of gasifying agents are carbonates, nitrates and various organics such as urea. The feed particles are heated in a furnace to obtain simultaneous glass formation at the time of triggering the blowing agent to cause expansion.

U.S. Pat. No. 3,365,315 to Beck et al. describes a process for the preparation of "glass bubbles" between 5 and 300 microns in diameter by "blowing" or expanding pre-formed glass particles of particular compositions. It is speculated that the "blowing" is caused by gases adsorbed within and on the pre-formed glass particles.

Hendricks, in U.S. Pat. No. 4,133,854, uses a droplet generator and a urea blowing agent to form hollow glass spheres about 20–1000μ in diameter.

Garnier et al. in U.S. Pat. No. 4,778,502 disclose a method where glass particles to be expanded are obtained by finely grinding a solid precursor glass. A fluidizing agent is added to the ground glass particles to prevent agglomeration of the particles before or during the expansion by heating.

It is difficult to achieve a high yield of the desired small sized hollow spheres using known solid feed or liquid feed methods of generating the particles to be expanded.

In the solid feed method, the size of the resultant spheres can be reduced by grinding to reduce the size of the feed particles. Grinding is generally disadvantageous because it generates large amounts of unusable fines and can introduce unwanted impurities. Additionally, such grinding represents an additional process step which adds to the product cost.

In the liquid feed process, the size of the resultant spheres might be reduced by adding large amounts of water to the feed. This technique would involve large amounts of excess liquid and/or be difficult to control.

Accordingly, there remains a need for a simple, economical process for producing a high yield of small hollow spheres.

SUMMARY OF THE INVENTION

The present invention provides a method which overcomes the disadvantages of the prior art methods. The new method of the invention represents an economical, easily controlled, high yield process for producing small hollow glass microspheres.

In one aspect, the invention embraces a process for the preparation of hollow glass spheres comprising the steps of:

a) combining
   (i) a surfactant,
   (ii) at least one source of components necessary to form the glass,
   (iii) a compound capable of producing a gas when heated, and
   (iv) water to form an aqueous solution or dispersion;

b) forming droplets from the surfactant-containing solution or dispersion;

c) heating the droplets to remove water and generate gas as the glass is formed, thereby producing hollow glass spheres; and d) cooling and recovering the hollow glass spheres.

In a more specific aspect, the invention encompasses a process for the preparation of hollow glass spheres where the components necessary to form the glass include a source of silica, one or more metallic cations, and a boron-containing compound.

The surfactant is preferably a nonionic surfactant and more preferably a fluorocarbon surfactant. The surfactant concentration is preferably about 0.05 to 5 wt. % based on the total solution or dispersion, more preferably about 0.1 to 3 wt. %.

A preferred method of forming the droplets is by spraying. In further aspects, the invention encompasses using a nozzle as a droplet-forming means and spraying the droplets directly into a heated zone. Alternatively, the surfactant-containing solution or dispersion may be spray dried, and the spray-dried product fed into the heated zone.

DETAILED DESCRIPTION

Small hollow glass spheres are prepared by combining a surfactant, sources of the components needed to form the glass, and at least one gas generating agent to form an aqueous solution or dispersion. This solution or dispersion is formed into droplets. While specific embodiments of the invention refer to spraying and spray drying, it should be understood that the invention is not limited to any particular technique for forming the droplets. For example, emulsion and dripping techniques could also be used to form the droplets.

The addition of the surfactant results in the production of consistently small droplets, which result in a smaller, more consistent microsphere end product.

The droplets may be directly heated as they are formed or they may be first dried and then heated to form the hollow spheres. It should be understood that the invention is not limited to any particular method of heating the droplets or spray-dried particles. For example, microwave energy could be used to heat the droplets or particles. After expansion, the hollow spheres may then be cooled and collected.

In one embodiment, the solution or dispersion can be sprayed directly into a heated zone. Any nozzle or device can be used to form droplets. The spray can be directed horizontally or vertically; a vertical spray entering from the bottom and exiting from the top of the zone is preferred.

Alternatively, the solution or dispersion can be spray-dried, and the spray-dried particles can be fed into a heated zone horizontally or vertically. As with the spraying embodiment above, a vertical feed entering from the bottom and exiting from the top is preferred.

While the invention is not limited to any particular spraying nozzle or droplet forming device, the preferred nozzle for practicing the invention is a spiral nozzle design made and sold by Bete Fog Nozzle, Inc. under the name "Bete Fog Spiral Air Atomizer" (nozzle model no. 1"SA 12H-20N-.350 and tip model no. 3SA-6726).

The temperature of the heating is preferably between 800° and 1700° C., more preferably between 1000° and 1500° C. The temperature should be sufficient to form molten glass from the feed droplets or dried particles.

Heating time is preferably between 0.1 and 5 seconds, more preferably between 0.5 and 2 seconds.

Any aqueous solution or dispersion which contains precursors necessary to form a glass can be used in this invention. Preferred solutions may generally contain a soluble silicate or a colloidal silica (powder or sol) as silica sources, and various metallic cations including, but not limited to: sodium, potassium, lithium, calcium, barium, magnesium and aluminum. Boron in the form of borates or boric acid is also preferably present. Anions such as chloride, fluoride, nitrate, sulfate and acetate may also be present. Concentrations of each component may vary, but the silica content is generally between about 40 to 90 wt % based on the total solids in the solution or dispersion.

Any known gasifying agent(s), such as described in U.S. Pat. No. 2,978,340, can be used for gas generation. Urea is preferred. The urea concentration can be between 0.2 and 20 wt %, but preferred is a concentration between 0.4 and 12 wt % based on the total solids in the solution or dispersion.

The surfactant is can be any surfactant that will lower the surface tension of water. Preferred are nonionic surfactants which will not react with any of the cations or anions of the solution or dispersion. Most preferred are nonionic fluorocarbon surfactants. Included in this group are the fluorocarbon surfactants sold under the Fluorad ® trademark (3M Company) and the Zonyl ® trademark (DuPont Co.). The preferred surfactant of this group is Zonyl° FSN.

The surfactant dosage is preferably about 0.05 to 5% by weight of total solution or dispersion, more preferably about 0.1 to 3% by weight.

The following examples are given for illustrative purposes only, and are not meant to limit the subject invention. All parts and percentages are by weight unless otherwise indicated.

EXAMPLE 1

This example shows that the addition of a fluorocarbon surfactant can significantly lower the surface tension of a precursor solution used to prepare hollow glass spheres.

Deionized $H_2O$ (242 g) was heated to 50° C. Sodium silicate solution (240 g) containing 29.2 wt % $SiO_2$ and 9.1 wt % $Na_2O$ was added and mixed well. Boric acid (11 g) was added and dissolved in the above solution. Urea blowing agent (1.8 g) was then added and dissolved in the above. The above solution was split into two equal portions, A and B. Solution A was set aside, and 0.24 g of Zonyl ® FSN nonionic fluorocarbon surfactant (DuPont Company, Wilmington, Delaware) was added and mixed with solution B (Zonyl ® FSN is $R_fCH_2CH_2O(CH_2CH_2O)_xH$, where $R_f = F(CF_2CF_2)$ 3.8). The surface tension of both solutions A and B was determined using a Cahn Dynamic Contact Angle Analyzer. The results are shown in Table I below.

TABLE I

| Surface Tension of Precursor Solution, with and without Surfactant | | |
|---|---|---|
| | Contains Surfactant | Surface Tension (Dynes/cm) |
| A | No | 60.2 |
| B | Yes | 16.7 |

These results show that the surface tension of the precursor solution can be significantly lowered via the addition of a surfactant.

EXAMPLE 2

This example shows that significantly smaller hollow glass spheres can be prepared using the surfactant addition to the precursor solution.

Hollow glass spheres were prepared by using a precursor solution similar in composition to solution A of Example 1 (no surfactant). The spheres were prepared by pumping the solution through a nozzle at 600 cc/min into a flame inside an enclosed chamber. Flame temperature was approximately 1200° C. During this process, hollow glass spheres were formed and collected. The run lasted 2 hours. The mean particle size was determined using a Coulter Counter Model TA-II and a value of 33.8 microns was obtained.

The above experiment was repeated using Solution B described in Example 1 above (with surfactant). The mean particle size was 25 microns, thus showing a 26% reduction in mean particle size.

EXAMPLE 3

The experiment described in Example 2 was repeated, with the exception that the nozzle used in Example 2 (Custom Air Atomizer) was replaced with a Bete Fog Spiral Air atomizer. The particle sizes obtained were 18 microns with surfactant compared to 27 microns without surfactant, again showing that significantly smaller spheres can be obtained with a surfactant.

What is claimed is:

1. A process for the preparation of hollow glass spheres comprising the steps of:
   a) combining
      i) a surfactant,
      ii) at least one source of components necessary to form said glass,
      iii) a compound capable of producing a gas when heated, and
      iv) water, to form an aqueous solution or dispersion;
   b) forming droplets from the surfactant-containing solution or dispersion;

c) heating the droplets to form hollow glass spheres; and d) cooling and recovering the hollow glass spheres.

2. A process according to claim 1 wherein the droplets are formed by spraying the solution or dispersion.

3. A process according to claim 2 where the surfactant-containing solution or dispersion is spray-dried prior to said heating.

4. A process according to claim 1 where the surfactant is a nonionic surfactant.

5. A process according to claim 4, where the surfactant is fluorocarbon surfactant.

6. A process according to claim 1 where the surfactant concentration is about 0.05 to 5 wt. % based on the total solution or dispersion.

7. A process according to claim 6 where the surfactant concentration is about 0.1 to 3 wt. % based on the total solution or dispersion.

8. The process of claim 1 wherein said components necessary to form said glass include a source of silica, one or more metallic cations, and a boron-containing compound.

9. A process according to claim 8 where the source of silica is selected from the group consisting of sodium silicate, colloidal silica powder, silica sol, and mixtures thereof.

10. A process according to claim 8 where the metallic cations are selected from the group consisting of alkali metals or alkaline earths metals, and aluminum.

11. A process according to claim 8 where the boron compound is selected from the group consisting of boric acid, boric acid salt, and mixtures thereof.

12. A process according to claim 9 where the silica concentration is about 40-90 wt. % based on the total solids in the solution or dispersion.

13. A process according to claim 1 where the gas producing compound is urea.

14. A process according to claim 13 where the urea concentration is about 0.2 to 20 wt. % based on the total solids in the solution or dispersion.

15. A process according to claim 14 where the urea concentration is about 0.4 to 12 wt. % based on the total solids in the solution or dispersion.

16. A process according to claim 1 where said heating is at a temperature of about 800° to 1700° C.

17. A process according to claim 16 where said temperature is about 1000° to 1500° C.

18. A process according to claim 17 where the heating occurs for about 0.1 to 5 seconds.

19. A process according to claim 18 where the heating occurs for about 0.5 to 2 seconds.

20. A process according to claim 2 where the solution or dispersion is sprayed through a nozzle to form said droplets.

* * * * *